(No Model.)
J. M. BURFORD.
ATTACHMENT FOR PLOWS OR CULTIVATORS.
No. 405,693. Patented June 25, 1889.
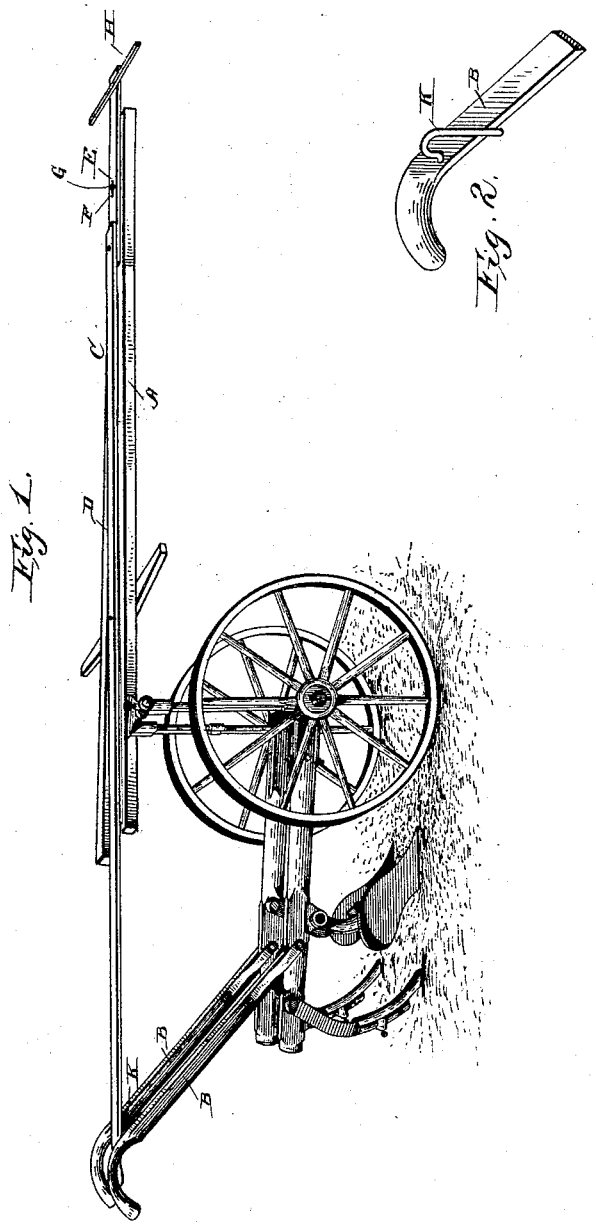
WITNESSES
Edwin L. Yewell
Harry C. Kennedy
INVENTOR
Jno. M. Burford
By D. McCleary
Attorney

UNITED STATES PATENT OFFICE.

JOHN M. BURFORD, OF WINFIELD, KANSAS.

ATTACHMENT FOR PLOWS OR CULTIVATORS.

SPECIFICATION forming part of Letters Patent No. 405,693, dated June 25, 1889.

Application filed April 11, 1888. Serial No. 270,308. (No model.)

*To all whom it may concern:*

Be it known that I, JOHN M. BURFORD, of Winfield, in the county of Cowley and State of Kansas, have invented certain new and useful Improvements in Attachments for Plows or Cultivators; and I do hereby declare the following to be a full, clear, and exact description of the invention, such as will enable others skilled in the art to which it pertains to make and use the same.

My invention relates to an attachment to be applied to plows, cultivators, or other machines, by which the same may be guided by the driver, who usually in such cases follows in the rear of the machine.

The object of my invention is to provide a simple and inexpensive device of this character that can be easily attached to a machine of the above-named class.

The invention consists in the details of construction and combination of parts hereinafter fully described and claimed.

In the drawings, Figure 1 is a perspective view of a cultivator with my improvement attached thereto. Fig. 2 illustrates a detail.

A represents a tongue, and B handles, of a plow.

C represents my invention, which is shown as attached to the upper side of the tongue.

The attachment C consists of two bars D and E. The rear bar D is pivoted to the tongue at a point just over the cross-tree and extends rearwardly between the handles B. The front bar E is pivoted to the rear bar D. F represents a slot formed in the bar E, and which is placed over a pin G arranged upon the tongue A. The front bar E is provided on its forward end with a cross-piece H, which is attached to the bridles of the horses.

K represents hooks which are arranged upon the handles, and by which the rear end of the bar D is secured.

The above-described device is intended to be used in connection with the ordinary reins or lines. The driver walks near the handles, and by moving the lever D to either side the cross-bar H is moved to guide the horses without using the lines, which latter are only used in turning or backing, and to hold the team when necessary.

Having fully described my invention, what I claim as new, and desire to secure by Letters Patent, is—

The combination, with the tongue of a plow or cultivator, of a guiding device consisting of the lever D, pivoted upon the tongue, a bar E, pivotally secured to the lever D, a cross-piece H, and hooks K, secured upon the handles of the plow or cultivator, substantially as set forth.

In testimony whereof I have signed this specification in the presence of two subscribing witnesses.

JOHN M. BURFORD.

Witnesses:
    W. G. GRAHAM,
    W. J. KENNEDY.